Feb. 9, 1932.    H. C. OTWELL    1,844,521
MOUNTING FOR AIRCRAFT MOTORS
Filed June 7, 1930
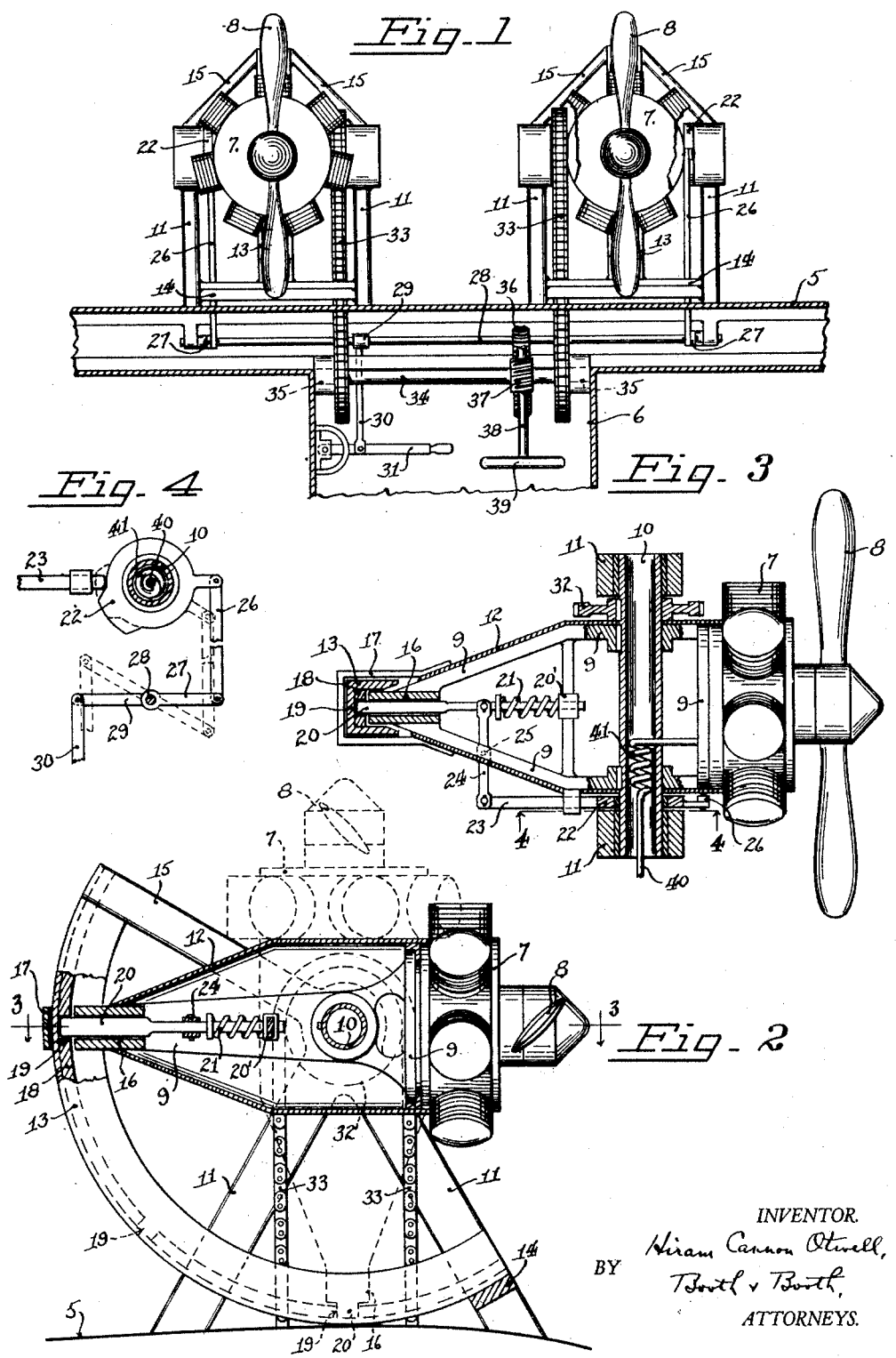
INVENTOR.
Hiram Cannon Otwell,
BY Booth & Booth,
ATTORNEYS.

Patented Feb. 9, 1932

1,844,521

UNITED STATES PATENT OFFICE

HIRAM CANNON OTWELL, OF SAN FRANCISCO, CALIFORNIA

MOUNTING FOR AIRCRAFT MOTORS

Application filed June 7, 1930. Serial No. 459,664.

The present invention relates to mountings for aircraft motors, and is applicable to flying machines of any type using either one or a plurality of motors.

The principal object of the invention is to provide means for tilting the axis of the propeller to any desired angle without necessitating a flexible connection between the propeller and its driving motor. For this purpose the entire motor is mounted for tilting to the desired angle. A second object of the invention is to provide a strong and rigid mounting for holding the motor in its various positions, and which will allow it to be easily tilted from one position to another. A still further object is to provide simple and easily operated means for tilting the motor, which can be applied to a plurality of motors to enable them to be tilted simultaneously. Still another object is to provide means for supplying fuel to the motor in all its positions. Other objects of the invention will become apparent from the following specification.

Although my invention may be applied to single motored airplanes, it will find its best use in planes having a plurality of motors. In such machines, some of the motors may be permanently mounted to provide forward propelling force, and others arranged for tilting to inclined or vertical positions, so that they may be used to assist in taking off and landing, or in emergencies, by providing an upward pulling force. In such cases it is naturally desirable that the motors, both fixed and tiltable, be symmetrically positioned with respect to the longitudinal center of the plane; for example, in a machine having four motors, two on each side; one motor on each side should be fixed and the other tiltable. It is not my intention, however, to limit the invention to any specific number or arrangement of motors.

The invention is most easily applied to airplanes of the type having one or more radial cylinder motors mounted above the uppermost wing, and for this reason it has been so illustrated in the drawings. It will be understood, however, that the invention may be applied to other types of aircraft and to other forms of motors, and further that the form, construction and arrangement of the several parts may be varied within the limits of the claims hereto appended without departing from the spirit of the invention as expressed therein.

A preferred embodiment of the invention is illustrated in the accompanying drawings, wherein:—

Fig. 1 is a front elevation, partly in section, of the upper wing of an airplane and the upper portion of the fuselage, showing two motors mounted above said wing.

Fig. 2 is a side elevation of one of the motors, showing it in both horizontal and vertical positions, certain portions of the motor frame being shown in section.

Fig. 3 is a horizontal section taken mainly on the line 3—3 of Fig. 2.

Fig. 4 is a sectional detail taken on the line 4—4 of Fig. 3.

In the drawings, the reference numeral 5 designates the upper wing of an airplane, and 6 is the cabin or fuselage. Any number of motors, indicated diagrammatically by the numeral 7, may be mounted above the wing 5, each driving a propeller 8. In order to simplify the drawings, I have shown two motors both of which are similarly mounted and adapted for tilting. In as much as the radial type of motor is best adapted to my mounting I have illustrated motors of this type.

In the preferred mounting, the motor 7, Figs. 2 and 3, is secured in any usual manner to the forward end of a frame 9, which is fixed upon a transverse horizontal shaft 10. The ends of said shaft are journaled in standards 11 rising from and rigidly secured to the wing 5. The rear end of the frame 9 is narrowed for stream-lining effect, and provides both a guide for the movement of said frame and a lock for holding it in any of its desired positions. The entire frame is preferably covered by a shell 12.

An arcuate guide member 13 of channel section is rigidly mounted in any desired manner, as for example by being secured at its lower end to a cross member 14 extending between the forward legs of the standards 11, and at its upper end to braces 15 extending rearwardly and upwardly from said standards. The rear end of the motor frame 9 has an extension 16 which travels within the channel of the guide 13, as the frame swings from its horizontal position shown in full lines in Fig. 2 to its vertical position, shown in dotted lines. A strap 17 passes freely around the outside of the channel member 13, and has its ends secured to the frame 9, as indicated in Fig. 3, thus preventing any possible separation between the end of said frame and the guide 13.

The guide 13 has within its channel a member 18 provided with notches 19 adapted for engagement by the rear end of a slidable bolt 20 carried within the end 16 of the frame 9. The forward end of said bolt is slidably guided by a bracket 20', and it is normally held in engagement with the notch 19 by a spring 21, thereby locking the frame 9 securely in position. The bolt is withdrawn from said notch by a cam 22 freely rotatable about the supporting shaft 10. The cam operates a rod 23 which is connected with the bolt 20 by a lever 24, the latter being fulcrumed at 25 in the frame 9. The cam 22 is rotated by a link 26, Figs. 1 and 4, which is connected with an arm 27 extending from a shaft 28 mounted preferably within the wing 5. If a plurality of motors are to be controlled simultaneously, each may be similarly connected with the shaft 28 as shown in Fig. 1. An arm 29, extending rearwardly from said shaft, is connected by a link 30 with a suitable operating lever 31 within the fuselage 6. It will be observed that if the motor is in a horizontal position and the cam is shifted to the position shown in dotted lines in Fig. 4, the bolt 20 will be withdrawn, thereby allowing the motor and its frame 9 to be swung about the axis of the shaft 10. When the cam following rod 23 rides off the lower end of the cam 22, the spring 21 causes the bolt 20 to engage the next notch 19 to which the swinging of the motor frame carries it, so that, by properly positioning the cam 22, the swinging movement of the motor frame can be arrested at the desired position.

Any suitable means may be provided for tilting the motor. As an example of a preferred means I have shown a sprocket 32 secured upon the motor supporting shaft 10, and connected by a chain 33 with a similar sprocket upon a transverse shaft 34, the latter being journaled in suitable bearings 35. A worm wheel 36 is secured upon the shaft 34 and is turned by a worm 37 operated by a shaft 38 and hand wheel 39 within the fuselage 6. The shaft 38 is understood to have suitable bearings, not shown. If a plurality of motors are to be tilted simultaneously, as shown in Fig. 1, each is connected by similar chains and sprockets with the shaft 34.

The above described mechanism provides a strong and easily operated means for tilting the motor or motors, and is sufficiently flexible so that its operation is not affected by the usual vibration of the motor and its mounting. When the bolt 20 is engaged with one of the notches 19 in the guide member, the motor is securely held against movement in any direction and can be operated at full power without movement upon its tilting axis. It is intended that, before releasing the bolt 20 to permit the tilting of the motor, it should be throttled down to idling speed. The chain and worm wheel tilting mechanism described should be of sufficient strength and power to tilt the motor easily while it is running at slow speed.

In order to supply fuel to the motor in all its positions, I prefer to employ a fuel pipe 40, Fig. 3, which has a portion of its length coiled into a helix 41 and positioned coaxially with the supporting shaft 10. A suitable location for said helix is within the shaft 10, which is preferably hollow in order to reduce its weight. By making the helix 41 with a sufficient number of turns, the amount of bending of the pipe at any one point is well within the elastic limit of any suitable metal. The pipe, after leaving the helix 41, passes through the wall of the tubular shaft 10 and continues forwardly to the motor. By positioning the helix within the shaft 10 it is entirely protected from mechanical injury. The portion of the pipe leading to the helix may be supported in any convenient manner not shown in the drawings.

I claim:—

1. In a flying machine having a motor and a propeller driven thereby, a frame to which said motor is secured, said frame having a rearward extension; means for mounting said frame to permit swinging movement thereof; a fixed arcuate guide member of channel cross section within which said extension travels, said guide member having spaced notches; a strap secured to said frame and freely surrounding said guide member to retain said extension in association therewith; and a locking member carried by said extension and adapted for engagement with said notches.

2. In a flying machine having a motor and a propeller driven thereby, a frame to which said motor is secured; means for mounting said frame for swinging movement; a fixed arcuate guide with which said frame is movably associated; a locking member carried by said frame for engagement with said guide; a cam mounted about the axis of movement of said frame; means operated by said cam for controlling said locking member; and means for moving said cam.

3. In a flying machine having a motor and a propeller driven thereby, a frame upon which said motor is carried; a tubular support about which said frame is mounted for swinging movement; and a conduit for supplying fuel to said motor, said conduit having a coiled portion within said tubular support permitting it to flex with the swinging of said frame.

4. In a flying machine having a wing, a fuselage below said wing, and a motor and propeller above said wing; a frame to which said motor is secured; a pivotal mounting for said frame; and means for swinging said frame comprising a sprocket associated therewith, a shaft in the upper portion of said fuselage, a chain connecting said shaft with said sprocket, a worm wheel secured to said shaft, a worm engaging said wheel, and means within the fuselage for rotating said worm.

In testimony whereof I have signed my name to this specification.

HIRAM CANNON OTWELL.